United States Patent
Götz et al.

(10) Patent No.: US 12,206,340 B2
(45) Date of Patent: Jan. 21, 2025

(54) GENERALIZED MULTILEVEL CONVERTER CIRCUIT TOPOLOGY WITH SWITCHED CAPACITORS

(71) Applicant: Dr. Ing. h.c. F. Porsche Aktiengesellschaft, Stuttgart (DE)

(72) Inventors: Stefan Götz, Forstern (DE); Nima Tashakor, Kaiserslautern (DE); Farzad Iraji, Kaiserslautern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 177 days.

(21) Appl. No.: 18/108,698

(22) Filed: Feb. 13, 2023

(65) Prior Publication Data

US 2023/0344368 A1 Oct. 26, 2023

(30) Foreign Application Priority Data

Apr. 25, 2022 (DE) ..................... 10 2022 109 825.7

(51) Int. Cl.
*H02M 7/797* (2006.01)
*H02M 1/00* (2006.01)
*H02M 7/483* (2007.01)

(52) U.S. Cl.
CPC ......... *H02M 7/797* (2013.01); *H02M 1/0074* (2021.05); *H02M 7/483* (2013.01)

(58) Field of Classification Search
CPC .............................. H02M 7/483; H02M 7/797
See application file for complete search history.

(56) References Cited

U.S. PATENT DOCUMENTS 9,325,252 B2 *   4/2016   Narimani ............ H02M 5/4585
9,698,704 B2     7/2017   Hiller
(Continued)

FOREIGN PATENT DOCUMENTS

DE   102019120947 B3   11/2020
WO     2017016675 A1    2/2017

OTHER PUBLICATIONS

Rao et al., "Cascaded Diode Clamped Inverter Based Grid-Connected Photovoltaic Energy Conversion System with Enhanced Power Handling Capability and Efficiency", IET Renewable Power Generation, 2021; 15, pp. 600-613.

(Continued)

*Primary Examiner* — Gary A Nash
(74) *Attorney, Agent, or Firm* — Buchanan Ingersoll & Rooney PC

(57) ABSTRACT

A method for arranging a generalized multilevel converter switching topology with switched capacitors for converting DC current into AC current, wherein the arrangement can be configured with regard to predetermined output voltage levels. With the same number of semiconductor switches, a higher number of voltage levels can be achieved in comparison to previous methods. Depending on the given problem, a maximum output voltage of the AC current may vary from significantly lower values than the input voltage of the DC current up to a multiple of these values. The generalized circuit topology may be adapted to a desired number of voltage levels by a repeatable arrangement of voltage level units that can be arranged in a row and to a multiphase load by a corresponding selection of a number of sub-modules. Furthermore, a modular multilevel converter configured with the circuit topology is described.

15 Claims, 8 Drawing Sheets

(56) References Cited

U.S. PATENT DOCUMENTS

| | | | | |
|---|---|---|---|---|
| 2015/0124506 | A1* | 5/2015 | Sahoo | H02P 27/14 |
| | | | | 363/126 |
| 2016/0218637 | A1* | 7/2016 | Fan | H02M 7/4835 |
| 2017/0358999 | A1* | 12/2017 | Geske | H02M 1/32 |
| 2018/0212530 | A1* | 7/2018 | Götz | H02M 7/4835 |
| 2021/0152099 | A1* | 5/2021 | Oh | H02M 7/4835 |

OTHER PUBLICATIONS

Hinago et al., "A Switched-Capacitor Inverter Using Series/Parallel Conversion", IEEE International Symposium Circuits and Systems, ISCAS 2010—May 30-Jun. 2, 2010—Paris, France, IEEE, US, (May 30, 2010), pp. 3188-3191, XP031725171.

Hinago et al., "A Single Phase Multilevel Inverter using Switched Series/Parallel DC Voltage Sources", Energy Conversion Congress and Exposition, 2009. ECCE. IEEE, IEEE, Piscataway, NJ, USA, Sep. 20, 2009 (Sep. 20, 2009), pp. 1962-1967, XP031887994.

Mandar et al., "Simulated Evaluation of Modern Multilevel Inverter Topologies", 2019 Innovations in Power and Advanced Computing Technologies (I-PACT), IEEE, Bd. 1, Mar. 22, 2019 (Mar. 22, 2019), pp. 1-5.

Iraji et al., "A Generalized Switched-Capacitor Modular Multilevel Inverter Topology for Multiphase Electrical Machines with Capacitor-Voltage Self-Balancing Capability", arXiv preprint arXiv:2204.06867, Apr. 4, 2022, 15 pages.

Babaei et al., "Hybrid Multilevel Inverter using Switched Capacitor Units", IEEE Transactions on Industrial Electronics, 2014, Journal Article, vol. 61, Iss. 9, pp. 4614-4621.

Gao et al., "A New Parallel-Connected Diode-Clamped Modular Multilevel Converter with Voltage Self-Balancing", IEEE Transactions on Power Delivery, Jun. 2017, vol. 32, No. 3, pp. 1616-1625.

Goetz et al., "Modular Multilevel Converter with Series and Parallel Module Connectivity: Topology and Control", Power Electronics, IEEE Transactions, 2015, vol. 30, No. 1, pp. 203-215.

Tashakor et al., "Modular Multilevel Converter with Sensorless Diode-Clamped Balancing Through Level-Adjusted Phase-Shifted Modulation", IEEE Transactions on Power Electronics, Jul. 2021, vol. 36, No. 7, pp. 7725-7735.

Vijeh et al., "A General Review of Multilevel Inverters Based on Main Submodules: Structural Point of View", IEEE Transactions on Power Electronics, Oct. 2019, vol. 34, No. 10, pp. 9479-9502.

\* cited by examiner

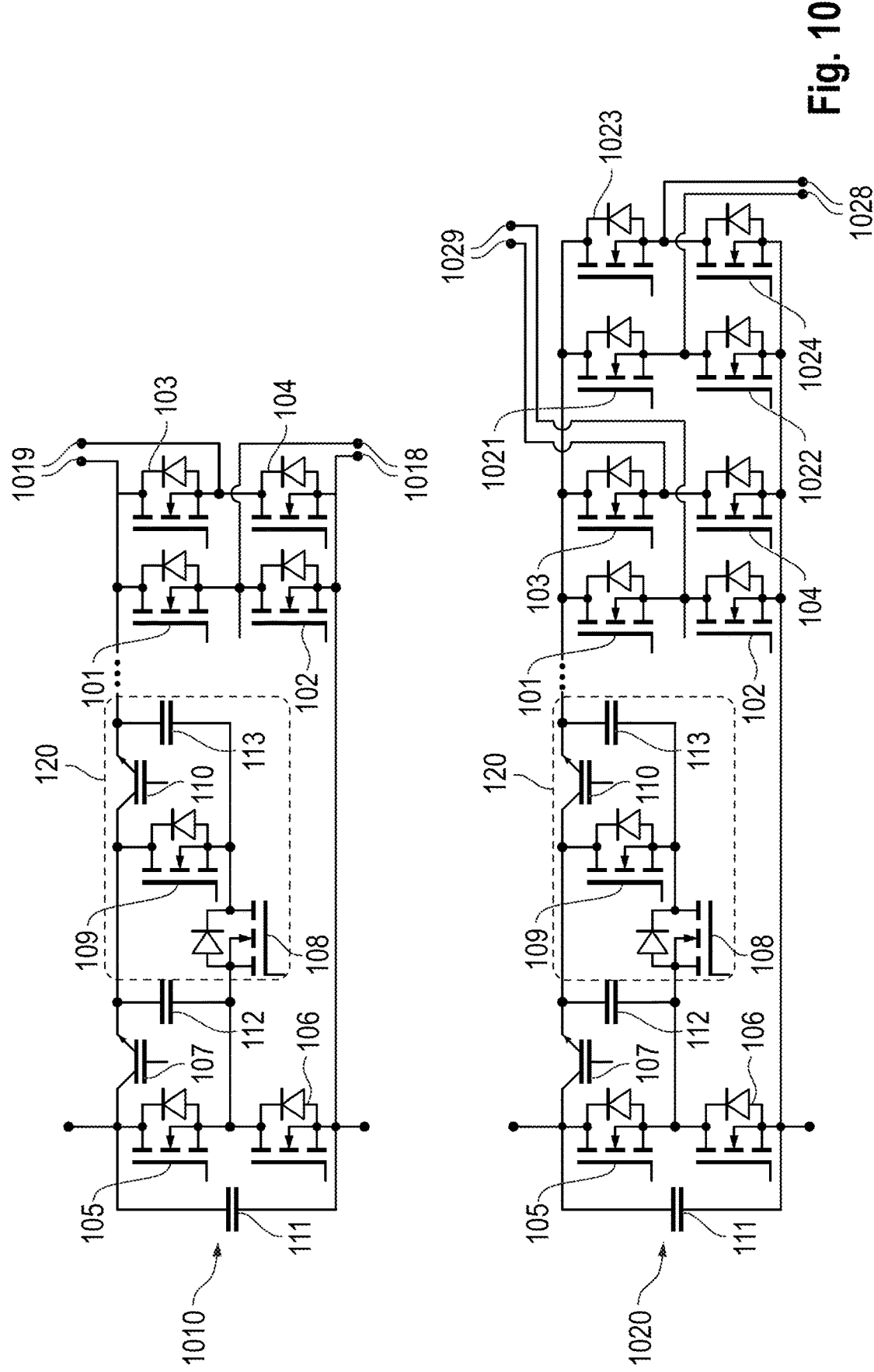

GENERALIZED MULTILEVEL CONVERTER CIRCUIT TOPOLOGY WITH SWITCHED CAPACITORS

CROSS-REFERENCE TO RELATED APPLICATION

This application claims priority to German Patent Application No. 10 2022 109 825.7, filed Apr. 25, 2022, the content of such application being incorporated by reference herein in its entirety.

FIELD OF THE INVENTION

The present invention relates to a modular multilevel converter in which a respective sub-module comprises at least one capacitor connected via semiconductor switches. A generalized circuit is introduced, which is expandable to a predetermined number of voltage levels.

BACKGROUND OF THE INVENTION

Power converters have proven to be very useful in a number of applications in daily life. For example, they convert a direct current generated by photovoltaics into AC power, just as they convert a DC voltage of batteries for an independent (AC) power supply, for example, of computer systems. Conversely, they may be configured as rectifiers that charge batteries from the low-voltage grid. They are also of particular interest for traction machines powered from battery packs carried along, of electric or partially electric vehicles, ships or locomotives.

However, a traditional three-phase supply of such traction machines with three-phase current does not necessarily represent the best possible system solution. For example, multiphase machines, i.e., electric machines with more than three phases, offer potential advantages, such as improved power distribution over the expanded number of phases, lower torque ripple, or better error tolerance. Regardless of the expanded number of phases, however, the DC/AC converter is of decisive importance due to its various possibilities for appropriate parameter control of electrical machines.

Conventional H-bridge inverters, cascaded H-bridge inverters, Z-source inverters, multilevel converters and modular multilevel converters are all examples of such converters. In recent years, multilevel converters in particular stood out due to their advantages (e.g., smaller harmonics in output or suitability for higher voltages) over a traditional three-level pulse duration modulation. However, the complexity and costs to implement higher voltage levels when using conventional circuit topologies increase excessively due to an exponential increase in the number of necessary components, such as semiconductor switches, gate drivers and capacitors, as described, for example, in Vijeh, M. Rezanejad, E. Samadaei and K. Bertilsson, "A General Review of Multilevel Inverters Based on Main Submodules: Structural Point of View," in IEEE Transactions on Power Electronics, vol. 34, no. 10, pp. 9479-9502, October 2019, doi: 10.1109/ TPEL.2018.2890649.

Moreover, risks arising from unbalanced capacitor voltages must be considered for multilevel converters. Balancing capacitor voltages of sub-modules of the multilevel converter to their nominal value therefore presents a major hurdle for an expansion of the number of phases. A possible way out is provided by circuits with self-balancing capacitor voltages realized, for example, in C. Gao and J. Lv, "A New Parallel-Connected Diode-Clamped Modular Multilevel Converter With Voltage Self-Balancing," in IEEE Transactions on Power Delivery, vol. 32, no. 3, pp. 1616-1625, June 2017, doi: 10.1109/ TPWRD.2017.2670662. Described herein is a parallel-connected three-point inverter topology wherein each strand has two parallel-connected groups of sub-modules. In such a circuit topology, the capacitor voltages of the sub-modules automatically balance out so that monitoring controllers are obsolete, but there is a considerable increase in components.

Alternatively, N. Tashakor, M. Kilictas, E. Bagheri and S. Goetz, "Modular Multilevel Converter With Sensorless Diode-Clamped Balancing Through Level-Adjusted Phase-Shifted Modulation," in IEEE Transactions on Power Electronics, vol. 36, no. 7, pp. 7725-7735, July 2021, doi: 10.1109/ TPEL.2020.3041599 proposes a three-point inverter topology with a single sub-module strand, which may be considered as the simplest three-point inverter topology with self-balancing capacitor voltages. However, such a topology could be fraught with efficiency losses in particularly imbalanced systems.

Switched capacitor circuits in power electronics are another field that has been highly developed in recent years. Converters having such switched capacitors vary voltages by reconfiguring serial/parallel connections of the capacitors, and thus resemble cascaded bridge inverters or modular multilevel converters. By means of circuit topologies composed of components of such switched capacitors and multilevel converters, both DC and AC current can be generated without modification, sometimes even with current paths via the same transistors. However, so far such instrumentalization of switched capacitors is added to a modular multilevel functionality between the individual sub-modules and does not take place within the individual sub-modules, which is why a large number of components, such as transistors and/or capacitors, sometimes even diodes, are likewise required.

Although the aforementioned latest developments in multilevel converters have demonstrated their intriguing possibilities, such as providing a large number of output voltages or integrated voltage amplification. Most existing circuit topologies have only a limited number of output voltage levels with a limited amplification ratio. In addition, for multilevel converters, balancing capacitor voltages is of decisive importance and should be considered in circuit topology or control.

SUMMARY OF THE INVENTION

Described herein is a method for arranging a circuit topology for a multiphase multilevel converter, which method can be easily adapted to a predetermined number of phase currents and is capable of generating an alternating current with a maximum output voltage far higher than an input voltage supplied by a DC current source. This is to be achieved by means of low-voltage capacitors. Furthermore, capacitor voltages in sub-modules should be able to automatically balance one another. Furthermore, a modular multilevel converter configured with the circuit topology is to be provided.

In order to achieve the aforementioned object, a method for arranging a circuit according to a circuit topology for a modular multilevel converter is proposed, wherein the modular multilevel converter comprises a controller and at least one sub-module, and wherein a plurality of semiconductor switches and a plurality of intermediate circuit capacitors are arranged according to the circuit topology in the at least one sub-module. The circuit topology provides for a first intermediate circuit capacitor, and a first half bridge in parallel thereto, between a lower input connection and an upper input connection. Furthermore, in parallel thereto, it provides a second and a third half bridge connected to the lower input connection and connected via a seventh semiconductor switch to the upper input connection. Moreover, it provides a second intermediate circuit capacitor arranged between a center tap of the first half bridge and the connection of the second and third half bridges to the seventh semiconductor switch. According to a predetermined number of voltage levels, the circuit topology can be expanded by two voltage levels by each selectively repeatable voltage level unit. In the second and the third half bridge, a respective upper semiconductor switch is switched complementarily to a respective lower semiconductor switch by the controller. The lower input connection is connected either to an upper input connection of a first adjacent sub-module or to a negative pole of a DC current source. The upper input connection is connected either to a lower input connection of a second adjacent sub-module or to a positive pole of a DC current source. A respective output connection is provided by means of a respective center tap at the two half bridges.

The respective repeatable voltage level unit comprises a respective intermediate circuit capacitor, a respective half bridge and a respective semiconductor switch. The respective intermediate circuit capacitor is connected with one end to a center tap of the respective half bridge and with another end to the respective semiconductor switch, wherein the respective semiconductor switch is in turn connected to an upper end of the respective half bridge. The respective repeatable voltage level unit can continue to be integrated via three connections in the circuit topology: A first connection is formed by the lower end of the respective half bridge and is respectively connected to the center tap of the first half bridge. A second connection is arranged by the upper end of the respective half bridge and a third connection is arranged at the connection between the respective half bridge and the respective intermediate circuit capacitor, wherein the second connection and the third connection are interposed between the connection of the seventh semiconductor switch to the two further half bridges.

The circuit topology according to aspects of the invention thus provides five voltage levels in its basic form (without the selectively repeatable voltage level unit). By the respective repeatable voltage level unit, this is respectively expanded by two voltage levels.

When selecting a respective semiconductor switch type, it should be considered that the lower or upper semiconductor switch of the first half bridge may respectively comprise an internal antiparallel diode, but that said diode is not absolutely necessary and may also be omitted. On the other hand, either the lower or the upper semiconductor switches of the second and third half bridges must respectively comprise an internal antiparallel diode, while they are not necessary for the intended power supply of the load in the respectively other upper or lower semiconductor switches of the second and third half bridges. Apart therefrom, no such internal antiparallel diodes are allowed in any further semiconductor switches outside of half bridges.

In one embodiment of the method according to aspects of the invention, the at least one sub-module is connected to one phase of a load at its respective output connections. By controlling the semiconductor switches by means of pulse duration modulation, an alternating current is generated.

In a further embodiment of the method according to aspects of the invention, a number of sub-modules is selected according to a predetermined number of phases of the load and the sub-modules are connected in series to one another. The circuit topology according to aspects of the invention thus advantageously allows a configuration with low-voltage intermediate circuit capacitors, even if the DC current source has a terminal voltage $V_{DC}$ in the high-volt range. An output voltage supplied at the output connections may be a fraction up to a multiple of said terminal voltage. Via N sub-modules connected in series to one another via their lower and upper input connections, a multiport multiphase inverter with N (output) phases is thus provided.

A load having multiple phases is also referred to as a multiphase load. By the arrangement according to aspects of the invention of multiple sub-modules, all intermediate circuit capacitors of the sub-modules self-balance at a voltage level of the DC current source. This advantageously avoids an otherwise necessary arrangement (known from the prior art) of voltage sensors or expensive control technology.

For a number $N_L$ of voltage levels, the circuit topology according to aspects of the invention comprises, as components per sub-module, a number $N_S$ of semiconductor switches, $$N_S = \frac{3N_L - 1}{2}, \qquad (1)$$

and a number $N_C$ of intermediate circuit capacitors $N_S$ of semiconductor switches, $$N_C = \frac{N_L - 1}{2}, \qquad (2)$$

wherein according to the above description pertaining to the internal antiparallel diodes, this results in a number $N_{NA}$ of semiconductor switches that must not comprise such a diode, $$N_{NA} = \frac{N_L - 3}{2}, \qquad (3)$$

a number $N_{WA}$ of semiconductor switches that must comprise such a diode, $$N_{WA} = 2, \qquad (4)$$

and a number $N_{OW}$ of semiconductor switches that may but do not necessarily have to comprise such a diode, $$N_{OW} = N_L - 1, \qquad (5)$$

The multiport multiphase inverter provided by the serial connection thus comprises N times $N_C$ intermediate circuit capacitors and N times $N_S$ semiconductor switches. The possible number $N_L$ of voltage levels per sub-module can be selected according to the requirements of the multiphase load, wherein a respective phase voltage supplied by the respective sub-module can be varied within these $N_L$ voltage levels. In principle, a different number of voltage level units may also be arranged in the respective sub-modules.

For N identical sub-modules, the following applies to capacities $C_{i1}$ of the first intermediate circuit capacitors connected in series:

$$C_{11} = C_{21} = \ldots = C_{N1}, \qquad (6)$$

which is why their respective capacitor voltages $V_{C_{i1}}$ also match:

$$V_{C_{11}} = V_{C_{21}} = \ldots = V_{C_{N1}}, \quad (7)$$

Since the DC current source with terminal voltage $V_{DC}$ and the series of the first intermediate circuit capacitors form a circuit, the following applies:

$$V_{DC} = \sum_{i=1}^{N} V_{C_{i1}}, \quad (8)$$

or $$V_{C_{11}} = V_{C_{21}} = \ldots = V_{C_{N1}} = \frac{V_{DC}}{N}. \quad (9)$$

From Eq. (9), it follows that the circuit topology according to aspects of the invention has an intrinsic voltage reduction for the first intermediate circuit capacitors compared to the DC current source.

In comparison to the capacitor voltages $V_{C_{i1}}$, the phase voltage $V_i$, can be adjusted to a desired value by the repeatable arrangement according to aspects of the invention of the voltage level unit of the i-th sub-module. This is given for $N_L$ voltage levels by $$V_i = \left\{ \pm \frac{kV_{DC}}{N} \,\middle|\, k \in \mathbb{N}, 0 < 2k + 1 \leq N_L \right\}. \quad (10)$$

The phase voltage $V_i$, that can be supplied can be raised above the terminal voltage $V_{DC}$ of the DC current source if $$N_L > 2N+1. \quad (11)$$

Regardless of the number of voltage levels $N_L$, the respective components should be selected appropriately in order to satisfy a nominal capacitor voltage or a drain source voltage of all semiconductor switches, except those of the second and third half bridges, of $V_{DC}/N$. On the other hand, the semiconductor switches of the second and third half bridges should be capable to persist at a drain source voltage of at most $(N_L-1)V_{DC}/2N$.

In yet a further embodiment of the method according to aspects of the invention, a number of sub-modules is selected according to a predetermined number of phases of the load and the sub-modules are connected in parallel to one another.

In another embodiment of the method according to aspects of the invention, in order to generate a DC voltage, the controller in at least one sub-module selectively switches either the upper semiconductor switch in the second half bridge to open and the upper semiconductor switch in the third half bridge to closed or the lower semiconductor switch in the second half bridge to open and the lower semiconductor switch in the third half bridge to closed. Depending on the load requirement, the controller in the at least one sub-module switches at least one intermediate circuit capacitor into the (DC) circuit connected to the output connections. A bypass of all intermediate circuit capacitors of the at least one sub-module is also conceivable.

In yet another embodiment of the method according to aspects of the invention, a first output connection of the second half bridge and a connection to the lower input connection are connected to corresponding connections of the first adjacent sub-module. A second output connection of the third half bridge and a connection to the upper input connection are connected to corresponding connections of the second adjacent sub-module. By instrumentalization of a parallel switching state known in modular multilevel converters with serial and parallel connectivity, a contribution to a total DC voltage output is generated. One such modular multilevel converter with serial and parallel connectivity, abbreviated as MMSPC, is, for example, described in "Goetz, S. M.; Peterchev, A. V.; Weyh, T., "Modular Multilevel Converter With Series and Parallel Module Connectivity: Topology and Control," Power Electronics, IEEE Transactions on, vol. 30, no. 1, pp. 203,215, 2015. doi: 10.1109/ TPEL.2014.231022. Due to the embodiment according to aspects of the invention, it is possible with the parallel switching state to switch respective intermediate circuit capacitors in respective adjacent sub-modules in parallel in a strand of sub-modules connected to one another via the respective input connections, namely in principle up to all intermediate circuit capacitors of all sub-modules.

In a continued other embodiment of the method according to aspects of the invention, a fourth and a fifth half bridge are arranged in parallel to the second and third half bridges. A respective center tap at the fourth and fifth half bridges is connected to corresponding connections of the first adjacent sub-module. The respective output connections of the second and third half bridges are connected to corresponding connections of the second adjacent sub-module. An alternating current is generated by the controller at the respective output connections, wherein, due to the additional fourth and fifth half bridges, the respective intermediate circuit capacitors of adjacent sub-modules can be connected in parallel.

Furthermore, a modular multilevel converter is claimed, wherein the modular multilevel converter comprises a controller and at least one sub-module. In the at least one sub-module, a plurality of semiconductor switches and a plurality of intermediate circuit capacitors are arranged according to a circuit topology. The circuit topology provides for a first intermediate circuit capacitor, and a first half bridge in parallel thereto, between a lower input connection and an upper input connection. Furthermore, in parallel thereto, it provides a second and a third half bridge connected to the lower input connection and connected via a seventh semiconductor switch to the upper input connection. Moreover, it provides a second intermediate circuit capacitor arranged between a center tap of the first half bridge and the connection of the second and third half bridges to the seventh semiconductor switch. According to a predetermined number of voltage levels, the circuit topology can be expanded by two voltage levels by each selectively repeatable voltage level unit. The controller is configured to switch, in the second and the third half bridge, a respective upper semiconductor switch complementarily to a respective lower semiconductor switch. The lower input connection is connected either to an upper input connection of a first adjacent sub-module or to a negative pole of a DC current source. The upper input connection is connected either to a lower input connection of a second adjacent sub-module or to a positive pole of a DC current source. A respective output connection is provided on the two half bridges by means of a respective center tap.

In a configuration of the modular multilevel converter according to aspects of the invention, the at least one sub-module is connected at its respective output connections to a phase of a load, wherein the controller is configured to generate an alternating current by means of pulse duration modulation.

In a further configuration of the modular multilevel converter according to aspects of the invention, a number of sub-modules according to a predetermined number of phases of the load is selected. The sub-modules are connected to one another in series.

In yet a further configuration of the modular multilevel converter according to aspects of the invention, a number of sub-modules according to a predetermined number of phases of the load is selected. The sub-modules are connected in parallel to the DC current source.

In another configuration of the modular multilevel converter according to aspects of the invention, in order to generate a DC voltage, the controller of at least one sub-module selectively switches either the upper semiconductor switch in the second half bridge to open and the upper semiconductor switch in the third half bridge to closed or the lower semiconductor switch in the second half bridge to open and the lower semiconductor switch in the third half bridge to closed.

In yet another configuration of the modular multilevel converter according to aspects of the invention, a first output connection of the second half bridge and a connection to the lower input connection are connected to corresponding connections of the first adjacent sub-module. A second output connection of the third half bridge and a connection to the upper input connection are connected to corresponding connections of the second adjacent sub-module. The controller is configured to generate a contribution of the respective sub-module to a total DC voltage output by instrumentalization of a parallel switching state in modular multilevel converters with serial and parallel connectivity.

In a continued other configuration of the modular multilevel converter according to aspects of the invention, a fourth and a fifth half bridge are arranged in parallel to the second and third half bridges. A respective center tap at the fourth and fifth half bridges is connected to corresponding connections of the first adjacent sub-module. The respective output connections of the second and third half bridges are connected to corresponding connections of the second adjacent sub-module. The controller is configured to generate an alternating current at the respective output connections. Due to the additional fourth and fifth half bridges, the respective intermediate circuit capacitors of adjacent sub-modules can be connected in parallel.

Advantageously, low-voltage capacitors or alternatively low-voltage energy storage cells can be used in the modular multilevel converter according to aspects of the invention to deal with DC power input in the high-voltage range and to provide AC power output, thereby keeping overall costs and installation space very low. The modular multilevel converter according to aspects of the invention advantageously allows an output alternating voltage with an amplitude between 4.2 V (three-level six-phase system) and 400 V (nine-level single-phase system) for a battery pack with 100 V terminal voltage as a DC current source, for example.

Furthermore claimed is a system comprising a DC current source, a load having at least one phase, and a modular multilevel converter according to aspects of the invention, wherein the modular multilevel converter is configured to perform a method according to aspects of the invention. The system is, for example, part of a traction system of a vehicle, wherein the load is an electric motor.

Additional advantages and configurations of the invention result from the description and the enclosed drawing.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWINGS

The FIGs. are described contiguously and comprehensively, and the same components are associated with the same reference signs.

FIG. 10 shows two further circuit diagrams with parallel functionality in yet other configurations of the circuit topology according to aspects of the invention.

DETAILED DESCRIPTION OF THE INVENTION

Figure 1:
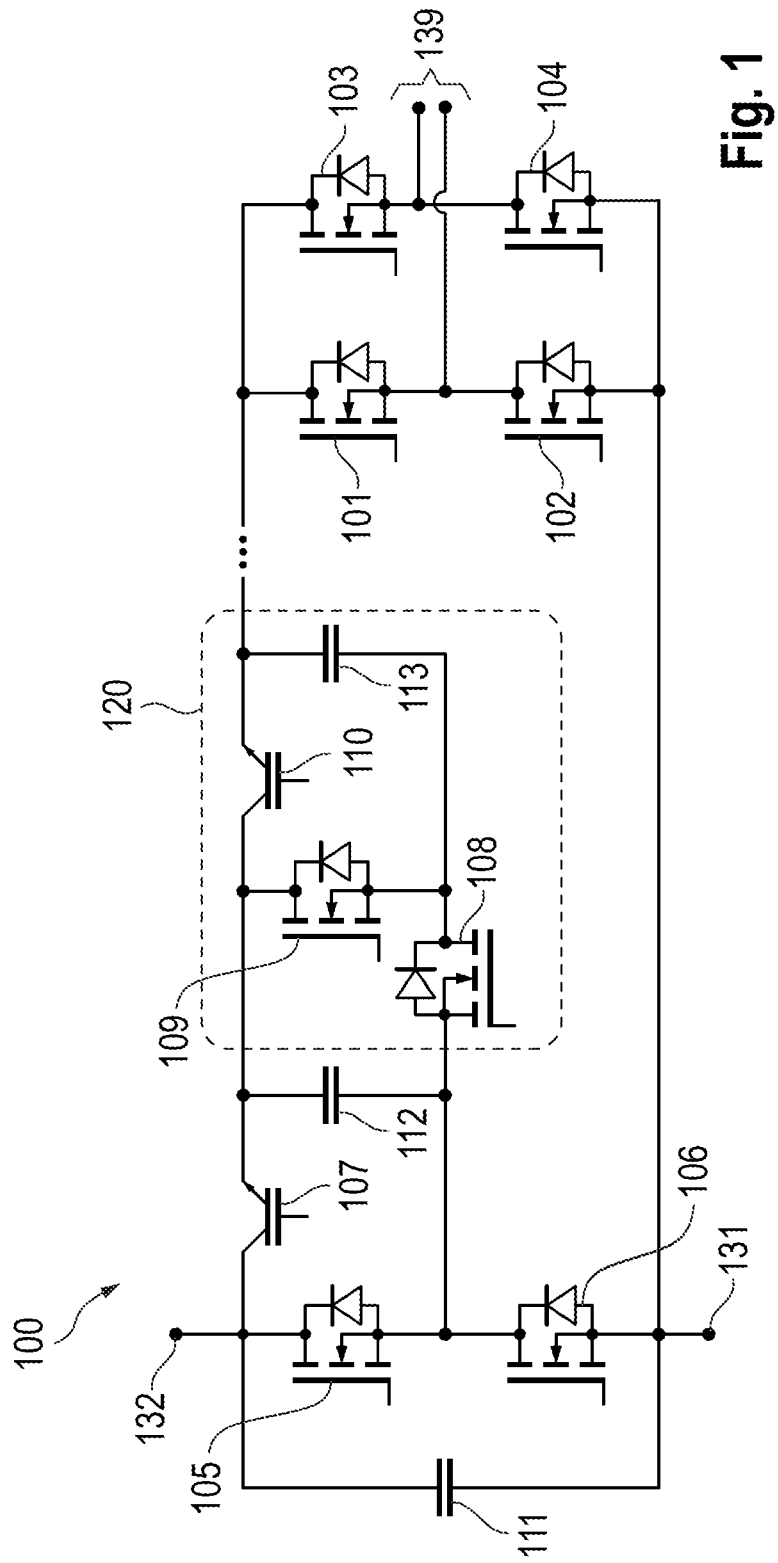
FIG. 1 shows a generalized circuit diagram in a configuration of the circuit topology according to aspects of the invention.

In FIG. 1, a generalized circuit topology 100 for an i-th sub-module is shown in a configuration of the circuit topology according to aspects of the invention. A first intermediate circuit capacitor $C_{i1}$ 111 and, in parallel thereto, a first half bridge having a fifth semiconductor switch $S_{i5}$ 105 and a sixth semiconductor switch $S_{i6}$ 106 are arranged between a lower input connection 131 and an upper input connection 132. Furthermore in parallel thereto, a second half bridge is connected to a first semiconductor switch $S_{i1}$ 101 and a second semiconductor switch $S_{i2}$ 102, and a third half bridge is connected to a third semiconductor switch $S_{i3}$ 103, and a fourth semiconductor switch $S_{i4}$ 104 is connected to the lower input connection 131 and, via a respectively repeatable voltage level unit 120 and a seventh semiconductor switch $S_{i7}$ 107 to the upper input connection 132. Moreover, a second intermediate circuit capacitor $C_{i2}$ is arranged between a center tap of the first half bridge and the seventh semiconductor switch $S_{i7}$ 107. By a respective center tap at the second and third half bridges, an output voltage is provided at an output connection 139 to a load. The repeatable voltage level unit 120 comprises a third intermediate circuit capacitor $C_{i3}$, a further half bridge comprising an eighth semiconductor switch $S_{i8}$ 108 and a ninth semiconductor switch $S_{i9}$ 109, and a tenth semiconductor switch. By respectively repeating the voltage level unit 120, the generalized circuit topology 100 is expanded by respectively two voltage levels, whereby the output voltage can advantageously be varied according to a predetermined number of voltage levels.

Figure 2:
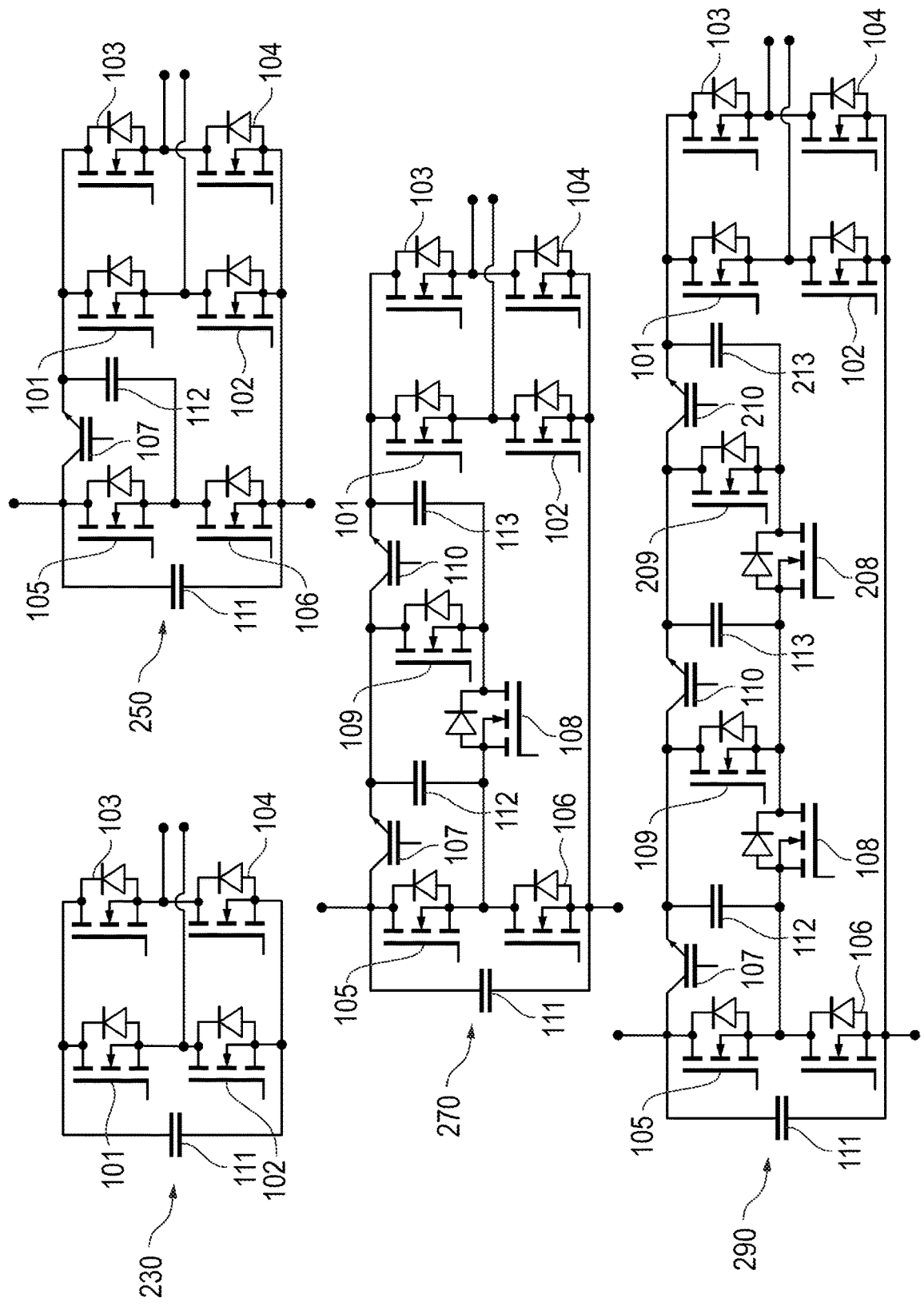
FIG. 2 shows circuit diagrams with different numbers of voltage level units in further configurations of the circuit topology according to aspects of the invention.

FIG. 2 shows circuit diagrams 230, 250, 270, 290 with different numbers of voltage level units in further configurations of the circuit topology according to aspects of the invention. While a three-level circuit topology 230 known from the prior art can be derived from the generalized circuit topology 100 in FIG. 1 by omitting the first half bridge with semiconductor switches 105 and 106, as well as further components 107 and 112, a five-level circuit topology 250, a seven-level circuit topology 270, and a nine-level circuit topology 290 are correspondingly obtained by omitting the voltage level unit 120, by arranging once the voltage level unit 120, and by arranging twice the voltage level unit 120 of FIG. 1. In the nine-level circuit topology 290, the repeated arrangement adds a repeated eighth semiconductor switch $S_{i11}$ 208, a repeated ninth semiconductor switch $S_{i12}$ 209, a repeated tenth semiconductor switch $S_{i13}$ 210, and a repeated third intermediate circuit capacitor $C_{i4}$ 213.

Figure 3:
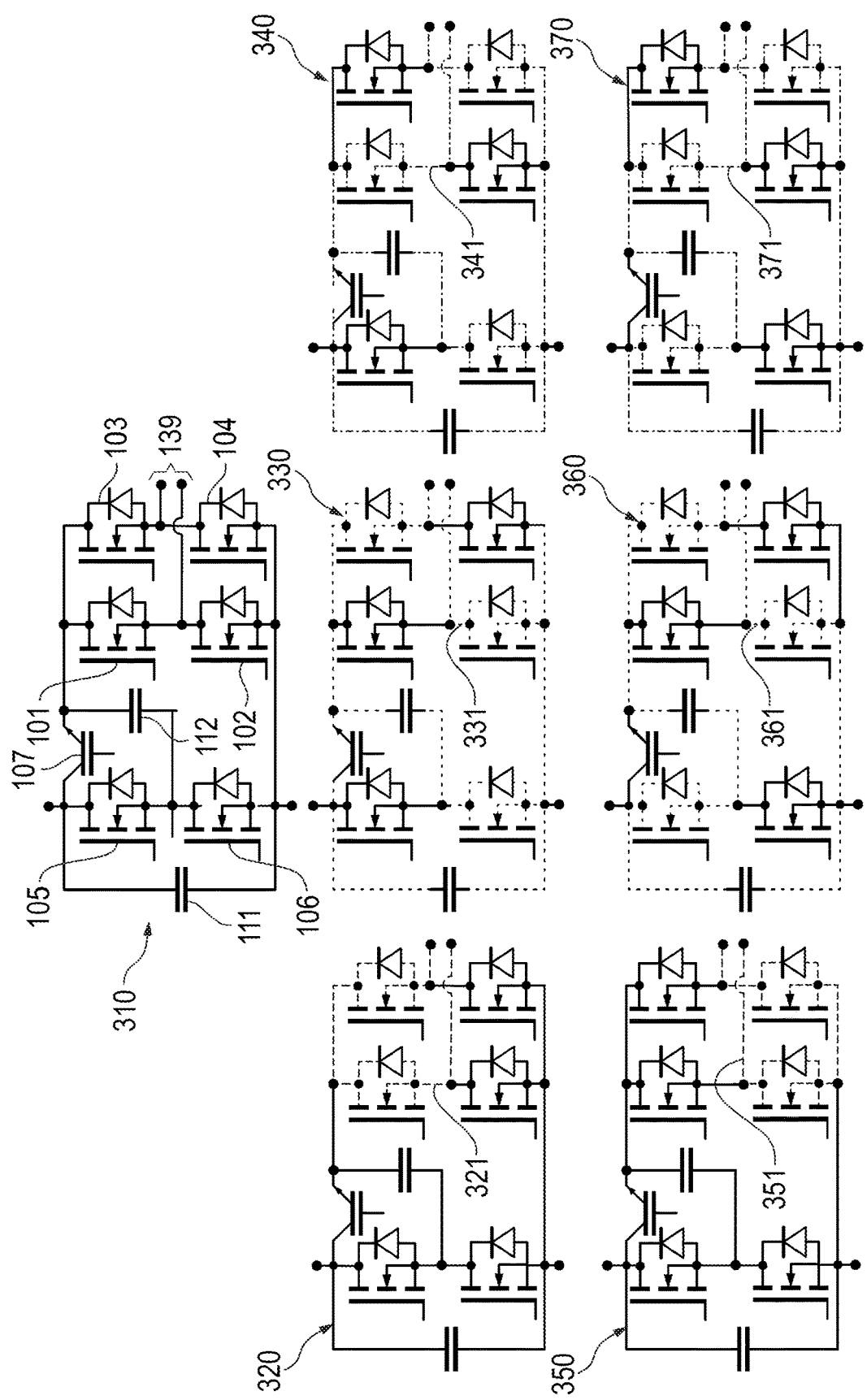
FIG. 3 shows current paths in a circuit diagram with five voltage levels in yet a further configuration of the circuit topology according to aspects of the invention.

FIG. 3 shows current paths 321, 331, 341, 351, 361, 371 in a circuit diagram 310, 320, 330, 340, 350, 360, 370 with five voltage levels in yet a further configuration of the circuit topology according to aspects of the invention. Using the five-level circuit topology 310, a first zero-voltage-level path 321 in the circuit diagram 320, a positive-voltage-level path 331 in the circuit diagram 330, a negative-voltage-level path 341 in the circuit diagram 340, a second zero-voltage-level path 351 in the circuit diagram 350, a dual-positive-voltage-level path 361 in the circuit diagram 360, and a dual-negative-voltage-level path 371 in the circuit diagram 370 are shown. Six different current paths 321, 331, 341, 351, 361, 371 are thus shown, resulting in five voltage levels $-2V_{C_{i1}}$, $-V_{C_{i1}}$, 0, $+V_{C_{i1}}$, $+2V_{C_{i1}}$. This is achieved via seven (power) semiconductor switches $S_{i1}$ 101, $S_{i2}$ 102, $S_{i3}$ 103, $S_{i4}$ 104, $S_{i5}$ 105, $S_{i6}$ 106, $S_{i7}$ 107 and two intermediate circuit capacitors $C_{i1}$ 111 and $C_{i2}$ 112, wherein in the second and third half bridges, the respectively upper semiconductor switches $S_{i1}$ 101 and $S_{i3}$ 103 are switched complementarily to the respectively lower semiconductor switches $S_{i2}$ 102 and $S_{i4}$ 104. It should be noted that either the lower semiconductor switches ($S_{i2}$ 102 and $S_{i4}$ 104) or the upper semiconductor switches ($S_{i1}$ 101 and $S_{i3}$ 103) of the second and third half bridges respectively comprise an internal antiparallel diode, while the latter are optional in the respectively other semiconductor switches of the second and third half bridges, i.e., the respectively upper semiconductor switches ($S_{i1}$ 101 and $S_{i3}$ 103) or lower semiconductor switches ($S_{i2}$ 102 and $S_{i4}$ 104). Just as optional are internal antiparallel diodes in the fifth semiconductor switch $S_{i5}$ 105 and the sixth semiconductor switch $S_{i6}$ 106 of the first half bridge, while the seventh semiconductor switch $S_{i7}$ 107 must not comprise an internal antiparallel diode. As can be seen from the circuit topology according to aspects of the invention, a negative connection of the first intermediate circuit capacitor 111 is intrinsically connected to a zero point of a load phase. Depending on a respective switching state of the sub-module, one of five voltage levels of the output voltage can be represented, which is described further below.

First, with circuit diagrams 320 and 350, there are two zero-voltage-level paths 321 and 351, which do not provide a voltage contribution to a load current flowing through the output connection 139, wherein either the semiconductor switches $S_{i1}$ 101 and $S_{i3}$ 103 in the first zero-voltage-level path 321 and the semiconductor switches $S_{i2}$ 102 and $S_{i4}$ 104 in the second zero-voltage-level path 351 are closed. Meanwhile, the respective zero-voltage-level paths 321 and 351 do not affect the two intermediate circuit capacitors $C_{i1}$ 111 and $C_{i2}$ 112, wherein, however, it is possible that said capacitors, possibly connected in parallel to balance their capacitor voltages, may be charged by a DC voltage source connected to the input connections. A DC voltage source or a DC current source may be realized as a battery, capacitor, solar cell or solar module, DC voltage or DC current output of an electrical converter (e.g., power electronics), rectifier output, or the like, The positive-voltage-level path 331 in the circuit diagram 330 is formed by closed semiconductor switches $S_{i2}$ 102, $S_{i3}$ 103, $S_{i6}$ 106, and $S_{i7}$ 107 and adds a voltage level $+V_{C_{i1}}$ to the load current. The respective closed semiconductor switches charge the second intermediate circuit capacitor $C_{i2}$ 112 up to the capacitor voltage $V_{C_{i1}}$ so that $V_{C_{i1}}=V_{C_{i2}}$.

Two voltage levels $V_i=V_{C_{i1}}+V_{C_{i1}}$ are achieved in the circuit diagram 360 by the dual-positive-voltage-level path 361 with the two intermediate circuit capacitors $C_{i1}$ 111 and $C_{i2}$ 112. Since, in a switching cycle for generating an alternating voltage, a switching state with two positive voltage levels follows a switching state with one positive voltage level, the intermediate circuit capacitor $C_{i2}$ 112 was charged to the capacitor voltage $V_{C_{i2}}=V_{C_{i1}}$ in the previously actuated switching state with one voltage level. The two capacitor voltages are thus equal and $V_i=+2V_{C_{i1}}$ applies. The dual-positive-voltage-level path 361 is formed by means of closed semiconductor switches $S_{i2}$ 102, $S_{i3}$ 103, and $S_{i5}$ 105, while the remaining semiconductor switches of the sub-module are open.

In the negative-voltage-level path 341, the semiconductor switches $S_{i1}$ 101, $S_{i4}$ 104, $S_{i6}$ 106, and $S_{i7}$ 107 are closed, resulting in an output voltage $V_i=-V_{C_{i1}}$. In particular, the two closed semiconductor switches $S_{i6}$ 106 and $S_{i7}$ 107 form a current path through which the second intermediate circuit capacitor $C_{i2}$ 112 is charged to the capacitor voltage of the first intermediate circuit capacitor $C_{i1}$ 111, ultimately resulting in $V_{C_{i2}}=V_{C_{i1}}$ when charging is completed.

The dual-negative-voltage-level path 371 is formed by closed semiconductor switches $S_{i1}$ 101, $S_{i4}$ 104, and $S_{i5}$ 105, and the lowest output voltage is formed with $V_i=-(V_{C_{i1}}+V_{C_{i2}})$. Since, in the switching cycle for generating the alternating voltage, a switching state with two negative voltage levels follows a switching state with one negative voltage level, the intermediate circuit capacitor $C_{i2}$ 112 was charged to the capacitor voltage $V_{C_{i2}}=V_{C_{i1}}$ in the previously actuated switching state with one voltage level. The two capacitor voltages are thus equal and $V_i=-2V_{C_{i1}}$ applies.

The sub-module states leading to a respective output voltage are shown in Table 1 as a function of a respective semiconductor switch position.

TABLE 1

| Diagram | $S_{i1}$ | $S_{i2}$ | $S_{i3}$ | $S_{i4}$ | $S_{i5}$ | $S_{i6}$ | $S_{i7}$ | $V_i$ |
|---|---|---|---|---|---|---|---|---|
| 320 | ON | OFF | ON | OFF | OFF | OFF | OFF | 0 |
| 330 | OFF | ON | ON | OFF | OFF | ON | ON | $+V_{C_{i1}}$ |
| 340 | ON | OFF | OFF | ON | OFF | ON | ON | $-V_{C_{i1}}$ |
| 350 | OFF | ON | OFF | ON | OFF | OFF | OFF | 0 |
| 360 | OFF | ON | ON | OFF | ON | OFF | OFF | $+2 V_{C_{i1}}$ |
| 370 | ON | OFF | OFF | ON | ON | OFF | OFF | $-2 V_{C_{i1}}$ |

Figure 4:
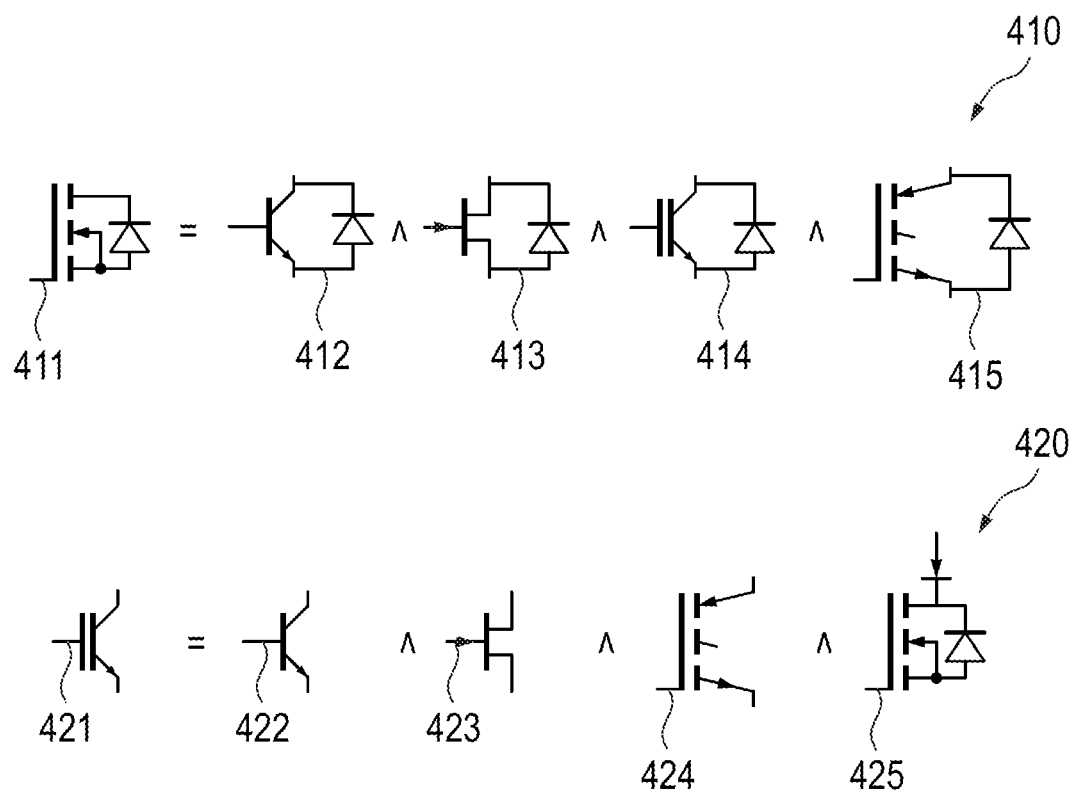
FIG. 4 shows a selection of semiconductor switches for the circuit topology according to aspects of the invention.

FIG. 4 shows a selection of semiconductor switches for the circuit topology according to aspects of the invention. As explained above, the antiparallel diode is necessary for some semiconductor switches in the sub-module, while it is not absolutely necessary or even prohibited for other semiconductor switches. A selection of semiconductor switches with an antiparallel diode is shown in diagram 410. Although a symbol used in the circuit diagrams of the FIGs. for the semiconductor switches of the half bridges stands for a metal-oxide-semiconductor field-effect transistor MOSFET 411, it may also be replaced in terms of circuitry by a bipolar junction transistor (BJT) 412 or a field-effect transistor (FET) 413 or a bipolar junction transistor with an isolated gate electrode and npn structure (IGBT/NPN) 414 or an n-channel bipolar junction transistor with an isolated gate electrode (IGBT/N-channel) 415, each provided with the antiparallel diode. However, the selection shown is not intended to exclude further semiconductor switch types with an antiparallel diode. A selection of semiconductor switches without an antiparallel diode is shown in diagram 420. Although a symbol used in the circuit diagrams of the FIGs. for such semiconductor switches stands for a bipolar junction transistor with an isolated gate electrode and npn structure (IGBT/NPN) 421, it may also be replaced in terms of circuitry by a bipolar junction transistor (BJT) 422 or a field-effect transistor (FET) 423 or an n-channel bipolar junction transistor with an isolated gate electrode (IGBT/N-channel) 424 or a field-effect transistor (FET) with an upstream diode 425. However, the selection shown here is also not intended to exclude further semiconductor switch types without an antiparallel diode.

Figure 5:
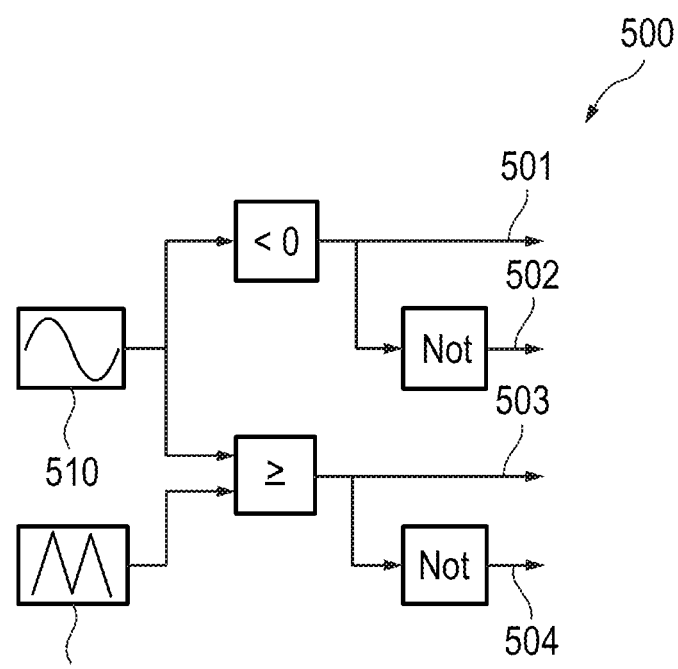
FIG. 5 shows a control scheme for second and third half bridges of the circuit topology according to aspects of the invention.

FIG. 5 shows a control scheme 500 for second and third half bridges of the circuit topology according to aspects of the invention by means of pulse duration modulation. In order to generate a sinusoidal waveform in the output voltage of each sub-module, the pulse duration modulation is used, while voltage references for multiphase voltages are provided by changing a respective reference voltage 510 for a respective sub-module. This is implemented by means of the control scheme 500, wherein the reference voltage 510 of the i-th phase $V_i^*$ and a carrier signal 520 are used to generate a gate signal 501 for semiconductor switches $S_{i1}$, a gate signal 502 for semiconductor switches $S_{i2}$, a gate signal 503 for semiconductor switches $S_{i3}$, and a gate signal 504 for semiconductor switches $S_{i4}$. A whole range of control methods for load regulation are conceivable in order to generate the reference voltage 510. A simple example is a sinusoidal waveform:

$$V_i^* = \sin\left(2\pi ft + \frac{2\pi i}{N}\right). \tag{12}$$

Figure 6:
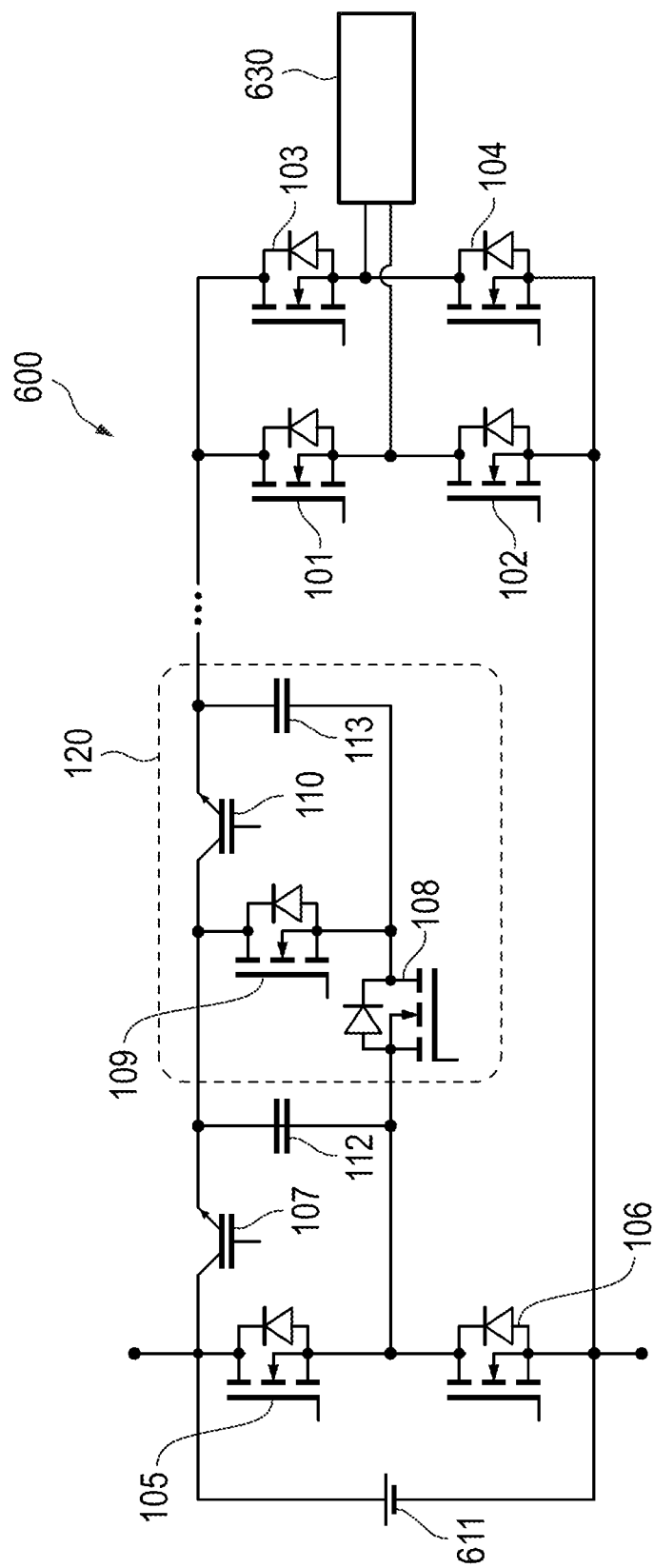
FIG. 6 schematically shows a circuit in a configuration of the circuit topology according to aspects of the invention.

FIG. 6 schematically shows a circuit 600 with a single load 630 in a first configuration of the circuit topology according to aspects of the invention. Without being connected to further sub-modules, the circuit 600 generates a single-phase AC current for the single load 630 from a DC current source 611.

Figure 7:
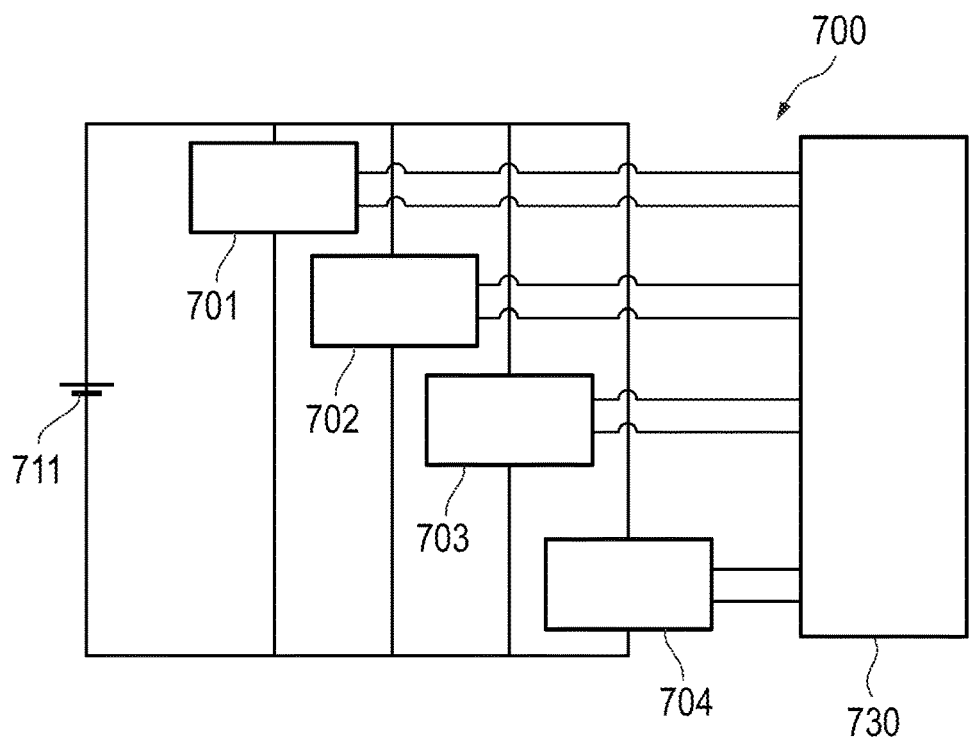
FIG. 7 schematically shows a parallel connection of sub-modules in a configuration of the multilevel converter according to aspects of the invention.

FIG. 7 schematically shows a parallel connection 700 of sub-modules in a second configuration of the multilevel converter according to aspects of the invention. The respective sub-modules 701, 702, 703, 704 connected in parallel to a DC current source 711 at their input connections each generate a phase of a multiphase current for a multiphase load 730.

Figure 8:
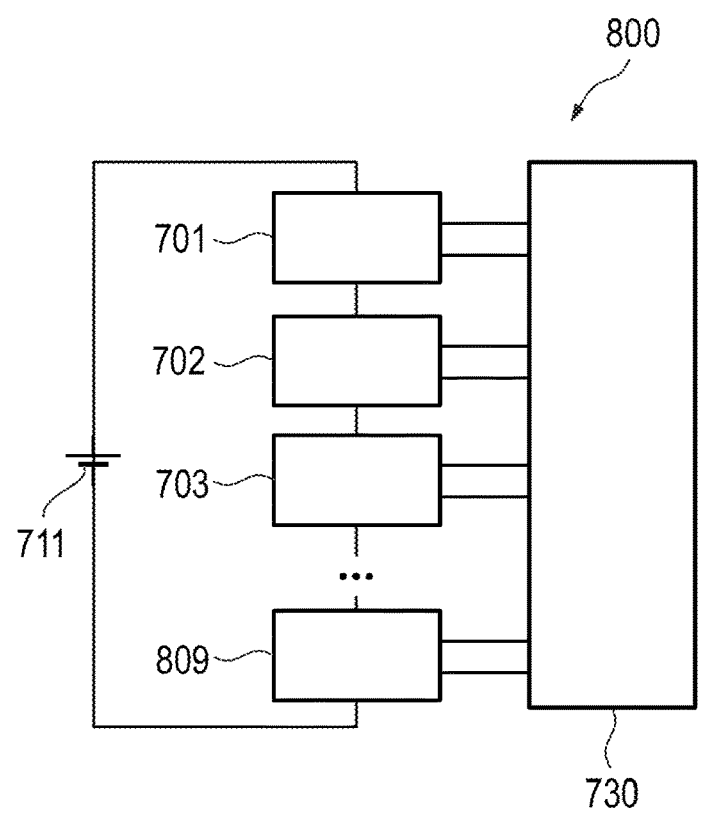
FIG. 8 schematically shows a serial connection of sub-modules in a further configuration of the multilevel converter according to aspects of the invention.

FIG. 8 schematically shows a serial connection 800 of sub-modules in a further configuration of the multilevel converter according to aspects of the invention. The respective sub-modules 701, 702, 703, 809 each generate a phase of a multiphase current for a multiphase load 730. The sub-modules 701, 702, 703, 809 are connected in series to one another at their input connections, wherein a first sub-module 701 and an N-th sub-module 809 are connected to the DC current source 711. As a result, an input voltage of each sub-module 701, 702, 703, 809 is reduced by a divisor 1/ N compared to a terminal voltage $V_{DC}$ of the DC current source 711 (see Eq. (9)).

Figure 9:
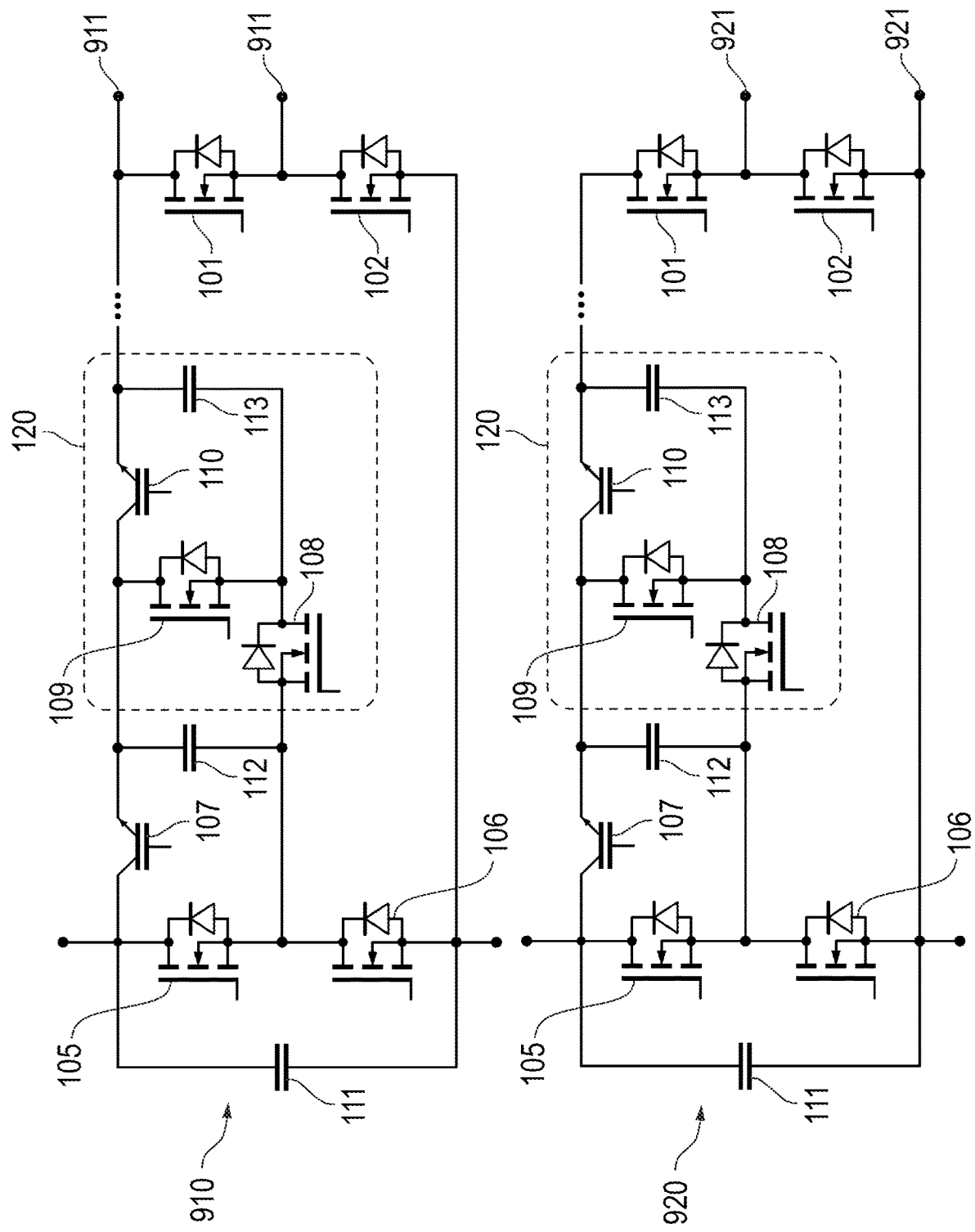
FIG. 9 shows two replacement circuit diagrams for the DC voltage output in another configuration of the circuit topology according to aspects of the invention.

FIG. 9 shows two replacement circuit diagrams 910, 920 for the DC voltage output in another configuration of the circuit topology according to aspects of the invention. By suitable controlling of a respective sub-module, and in particular of the semiconductor switches $S_{i3}$ 103 and $S_{i4}$ 104 in the third half bridge (see FIG. 1), the respective sub-module can be used to output DC voltage, depending on the number of voltage level units 120 with a different switchable voltage value. While the further semiconductor switches 105, 106, 107, 108, 109, 110 of the respective sub-module are suitably switched to generate a selected voltage level, the third semiconductor switch $S_{i3}$ 103 of FIG. 1 is open in the replacement circuit diagram 910 so that DC voltage connections 911 result for connection to 9 a DC voltage load, whereas the fourth semiconductor switch $S_{i4}$ 104 of FIG. 1 is open in the replacement circuit diagram 920 so that DC voltage connections 921 result for connection to the DC voltage load, FIG. 10 shows two circuit diagrams 1010, 1020 with parallel functionality in yet other configurations of the circuit topology according to aspects of the invention. In circuit diagram 1010, in accordance with known implementations of parallel functionality in modular multilevel converters, a connection 1018 to a preceding adjacent sub-module in a strand and a connection 1019 to a following adjacent sub-module in the strand are formed, but for outputting a DC current. In the circuit diagram 1020, a fourth half bridge with an eleventh semiconductor switch $S_{i11}$ 1021 and a twelfth semiconductor switch $S_{i12}$ 1022, and a fifth half bridge with a thirteenth semiconductor switch $S_{i13}$ 1023 and a fourteenth semiconductor switch $S_{i14}$ 1024 are additionally arranged in the circuit topology according to aspects of the invention (reference sign 100 in FIG. 1). With the center taps at the second and third half bridges (denoted in FIG. 1 by reference sign 139), a connection 1029 to a following adjacent sub-module in the strand is formed in accordance with known implementations of parallel functionality in modular multilevel converters, e.g., in the aforementioned MMSPC. By the center tap at the two newly added fourth and fifth half bridges, a connection 1028 is formed to a preceding adjacent sub-module in the strand. The circuit diagram 1020 is provided for an alternating current. Due to the arrangement according to aspects of the invention of the first half bridge with the semiconductor switches $S_{i5}$ 105 and $S_{i6}$ 106 and the repeatable voltage level unit 120, a voltage contribution of the respective sub-module to the alternating current can be formed.

LIST OF REFERENCE NUMBERS

100 Generalized circuit topology for i-th sub-module
101 First semiconductor switch $S_{i1}$
102 Second semiconductor switch $S_{i2}$
103 Third semiconductor switch $S_{i3}$
104 Fourth semiconductor switch $S_{i4}$
105 Fifth semiconductor switch $S_{i5}$
106 Sixth semiconductor switch $S_{i6}$
107 Seventh semiconductor switch $S_{i7}$
108 Eighth semiconductor switch $S_{i8}$
109 Ninth semiconductor switch $S_{i9}$
110 Tenth semiconductor switch $S_{i10}$
111 First intermediate circuit capacitor $C_{i1}$
112 Second intermediate circuit capacitor $C_{i2}$
113 Third intermediate circuit capacitor $C_{i3}$ 120 Repeatable voltage level unit
131 Lower input connection
132 Upper input connection
139 Connection to Load
208 Repeated eighth semiconductor switch Si11
209 Repeated ninth semiconductor switch Si12
210 Repeated tenth semiconductor switch $S_{i13}$
213 Repeated third intermediate circuit capacitor $C_{i4}$
230 Circuit with three-level circuit topology
250 Circuit with five-level circuit topology
270 Circuit with seven-level circuit topology
290 Circuit with nine-level circuit topology
310 Five-level circuit topology
320 Circuit diagram with output voltage zero
321 First zero-voltage-level path
330 Circuit diagram with output voltage $V_i$
331 Positive-voltage-level path
340 Circuit diagram with output voltage $-V_i$
341 Negative-voltage-level path
350 Circuit diagram with output voltage zero
351 Second zero-voltage-level path
360 Circuit diagram with output voltage $2V_i$
361 Dual-positive-voltage-level path
370 Circuit diagram with output voltage $-2V_i$
371 Dual-negative-voltage-level path
410 Semiconductor switch with an antiparallel diode
411 MOSFET
412 Bipolar junction transistor BJT
413 FET
414 IGBT (NPN)
415 IGBT (N-channel)
420 Semiconductor switch without an antiparallel diode
421 IGBT (NPN)
422 BJT
423 FET
424 IGBT (N-channel)
425 FET and diode
500 Control scheme for pulse duration modulation
501 To Gate $S_{i1}$
502 To Gate $S_{i2}$
503 To Gate $S_{i3}$
504 To Gate $S_{i4}$
510 Reference voltage of the i-th phase $V_i^*$
520 Carrier signal
600 Circuit diagram for single load
611 DC current source
630 Single-phase load
700 Circuit diagram with parallel connection
711 DC current source
701 First sub-module
702 Second sub-module
703 Third sub-module
704 Fourth sub-module
730 Multiphase load
800 Circuit diagram with serial connection
809 N-th sub-module
910 Replacement circuit diagram with first variant for DC output
911 Connection to Load
920 Replacement circuit diagram with second variant for DC output
921 Connection to Load
1010 Circuit diagram with DC output as first variant
1018 Connection to the preceding sub-module
1019 Connection to the following sub-module
1020 Circuit diagram with AC output as second variant
1021 Eleventh semiconductor switch
1022 Twelfth semiconductor switch
1023 Thirteenth semiconductor switch
1024 Fourteenth semiconductor switch
1028 Connection to the preceding sub-module
1029 Connection to the following sub-module

What is claimed is:

1. A method for arranging a circuit according to a circuit topology for a modular multilevel converter, wherein the modular multilevel converter comprises a controller and at least one sub-module, wherein in the at least one sub-module, a plurality of semiconductor switches and a plurality of intermediate circuit capacitors are arranged according to the circuit topology, wherein the circuit topology provides between a lower input connection and an upper input connection, a first intermediate circuit capacitor and a first half bridge in parallel thereto, furthermore in parallel thereto a second and a third half bridge, which are connected to the lower input connection and via a seventh semiconductor switch to the upper input connection, and moreover a second intermediate circuit capacitor, which is arranged between a center tap of the first half bridge and the connection of the second and third half bridges to the seventh semiconductor switch, wherein the circuit topology is configured to be expanded according to a predetermined number of voltage levels by respectively two voltage levels by a selectively repeatable voltage level unit, wherein the controller switches, in the second and the third half bridge, a respectively upper semiconductor switch complementarily to a respective lower semiconductor switch, wherein the lower input connection is connected either to an upper input connection of a first adjacent sub-module or to a negative pole of a DC current source, and the upper input connection is connected either to a lower input connection of a second adjacent sub-module or to a positive pole of the DC current source, and wherein, by the respective center tap, a respective output connection is provided at the two half bridges.

2. The method according to claim 1, wherein the at least one sub-module is connected at its respective output connections to a phase of a load, and wherein the controller of the semiconductor switch generates an alternating current by pulse duration modulation.

3. The method according to claim 1, wherein a number of sub-modules is selected according to a predetermined number of phases of the load, and the sub-modules are connected in series to one another.

4. The method according to claim 1, wherein a number of sub-modules is selected according to a predetermined number of phases of the load, and the sub-modules are connected in parallel to the DC current source.

5. The method according to claim 1, wherein, in order to generate a DC voltage, the controller in at least one sub-module selectively switches either the upper semiconductor switch in the second half bridge to open and the upper semiconductor switch in the third half bridge to closed or the lower semiconductor switch in the second half bridge to open and the lower semiconductor switch in the third half bridge to closed.

6. The method according to claim 1, wherein a first output connection of the second half bridge and a connection to the lower input connection are connected to corresponding connections of the first adjacent sub-module, wherein a second output connection of the third half bridge and a connection to the upper input connection are connected to corresponding connections of the second adjacent sub-module, and wherein, by instrumentalization of a parallel switching state in modular multilevel converters with serial and parallel connectivity, a contribution to a total DC voltage output is generated.

7. The method according to claim 1, wherein a fourth and a fifth half bridge are arranged in parallel to the second and third half bridges, wherein a respective center tap at the fourth and fifth half bridges is connected to corresponding connections of the first adjacent sub-module, wherein the respective output connections of the second and third half bridges are connected to corresponding connections of the second adjacent sub-module, and wherein the controller generates an alternating current at the respective output connections, wherein, due to the additional fourth and fifth half bridges, the respective intermediate circuit capacitors of adjacent sub-modules are connected in parallel.

8. A modular multilevel converter comprising:
a controller and at least one sub-module,
wherein in the at least one sub-module, a plurality of semiconductor switches and a plurality of intermediate circuit capacitors are arranged according to a circuit topology,
wherein the circuit topology provides between a lower input connection and an upper input connection, a first intermediate circuit capacitor and a first half bridge in parallel thereto, furthermore in parallel thereto a second and a third half bridge, which are connected to the lower input connection and via a seventh semiconductor switch to the upper input connection, and moreover a second intermediate circuit capacitor, which is arranged between a center tap of the first half bridge and the connection of the second and third half bridges to the seventh semiconductor switch,
wherein the circuit topology is configured to be expanded according to a predetermined number of voltage levels by respectively two voltage levels by a selectively repeatable voltage level unit,
wherein the controller is configured to switch, in the second and the third half bridge, a respectively upper semiconductor switch complementarily to a respective lower semiconductor switch, wherein the lower input connection is connected either to an upper input connection of a first adjacent sub-module or to a negative pole of a DC current source, and the upper input connection is connected either to a lower input connection of a second adjacent sub-module or to a positive pole of the DC current source, and
wherein, by the respective center tap, a respective output connection is disposed at the two half bridges.

9. The modular multilevel converter according to claim 8, wherein the at least one sub-module is connected at its respective output connections to a phase of a load, and wherein the controller is configured to generate an alternating current by pulse duration modulation.

10. The modular multilevel converter according to claim 8, wherein a number of sub-modules is selected according to a predetermined number of phases of the load, and the sub-modules are connected in series to one another.

11. The modular multilevel converter according to claim 8, wherein a number of sub-modules is selected according to a predetermined number of phases of the load, and the sub-modules are connected in parallel to the DC current source.

12. The modular multilevel converter according to claim 8, wherein in order to generate a DC voltage, the controller is configured to selectively hold either the upper semiconductor switch in the second half bridge open and the upper semiconductor switch in the third half bridge closed or the lower semiconductor switch in the second half bridge open and the lower semiconductor switch in the third half bridge closed.

13. The modular multilevel converter according to claim 8, wherein a first output connection of the second half bridge and a connection to the lower input connection are connected to corresponding connections of the first adjacent sub-module, wherein a second output connection of the third half bridge and a connection to the upper input connection are connected to corresponding connections of the second adjacent sub-module, and wherein the controller is configured to generate, by instrumentalization of a parallel switching state in modular multilevel converters with serial and parallel connectivity, a contribution of the respective sub-module to a total DC voltage output.

14. The modular multilevel converter according to claim 8, wherein a fourth and a fifth half bridge are arranged in parallel to the second and third half bridges, wherein a respective center tap at the fourth and fifth half bridges is connected to corresponding connections of the first adjacent sub-module, wherein the respective output connections of the second and third half bridges are connected to corresponding connections of the second adjacent sub-module, and wherein the controller is configured to generate an alternating current at the respective output connections, wherein, due to the additional fourth and fifth half bridges, the respective intermediate circuit capacitors of adjacent sub-modules are connected in parallel.

15. A system comprising a DC current source, a load having at least one phase, and the multilevel converter according to claim 8.

* * * * *